United States Patent [19]
Chubb et al.

[11] Patent Number: 5,644,940
[45] Date of Patent: Jul. 8, 1997

[54] PORTABLE SHEET METAL WORK-ROLL APPARATUS

[75] Inventors: Arthur B. Chubb, Romulus; Douglas G. Break, Livonia; Douglas J. Chubb, Dearborn Heights; James E. Suyak, Lincoln Park, all of Mich.

[73] Assignee: Tapco International Corporation, Plymouth, Mich.

[21] Appl. No.: 310,431

[22] Filed: Sep. 22, 1994

[51] Int. Cl.[6] ................................................. B21B 31/02
[52] U.S. Cl. ..................... 72/197; 72/237; 83/481; 83/492; 83/665
[58] Field of Search ........................... 72/185, 186, 191, 72/196, 197, 198, 203, 204, 237; 83/481, 489, 492, 495, 665, 676, 685, 331

[56] References Cited

U.S. PATENT DOCUMENTS

| | | | |
|---|---|---|---|
| 299,982 | 6/1884 | Hodgson | 83/447 |
| 1,936,228 | 11/1933 | Crafton | 72/178 |
| 3,173,325 | 3/1965 | Warren et al. | 83/499 |
| 3,332,326 | 7/1967 | Haas | 83/433 |
| 3,411,392 | 11/1968 | Spangler | 83/664 |
| 3,422,714 | 1/1969 | Van Gompel et al. | 83/498 |
| 3,951,024 | 4/1976 | Weiskopf | 83/498 |
| 4,026,176 | 5/1977 | Weiskopf | 83/502 |
| 4,224,850 | 9/1980 | Holmi et al. | 83/105 |
| 4,245,534 | 1/1981 | Van Cleave | 83/500 |
| 4,380,945 | 4/1983 | Guild et al. | 83/482 |
| 4,646,603 | 3/1987 | Held | 83/425.4 |
| 4,926,730 | 5/1990 | Garrett | 83/499 |
| 5,038,592 | 8/1991 | Knudson | 72/181 |

OTHER PUBLICATIONS

TAPCO Products Co., Inc. –"Tools for the Pro", Plymouth, Michigan, 1986.

Primary Examiner—Lowell A. Larson
Assistant Examiner—Thomas C. Schoeffler
Attorney, Agent, or Firm—Barnes, Kisselle, Raisch, Choate, Whittemore & Hulbert

[57] ABSTRACT

A portable slitter for selectively roll slitting rib forming or perforating sheet metal workpieces and having a beam-type frame, a pair of spaced thin walled and light weight rotary torque tube roll shafts mounted in the frame and supporting the work rolls, and a plurality of pairs of opposed stabilizing support blocks disposed between the shafts and the associated frame beams and providing further strength to the shafts by functioning as intermediate span shaft journal supports carrying the roll work loads imposed on shafts directly into the frame beams. The bearing members can be readily removed and adjusted longitudinally of the shafts without taking the frame apart. The slitter can be readily manually transported to the work site because it has a high strength-to-weight ratio and is light in overall weight. The slitter has substantial operational strength and improved work roll registry and alignment under continuous and/or adverse on-site operating conditions.

20 Claims, 6 Drawing Sheets

PORTABLE SHEET METAL WORK-ROLL APPARATUS

This invention relates to sheet metal slitters and particularly to portable sheet metal slitters.

BACKGROUND AND SUMMARY OF THE INVENTION

In portable sheet bending slitters, cutting rolls are mounted on parallel shafts that are counter-rotatably driven by a crank or small motor. A major problem with respect to such portable sheet slitters is that in order to provide accurate cutting and in addition forming of ribs and the like via opposed work rollers on the shafts the frame and shafts must be strong enough to withstand the heavy shaft spreading loads imposed by work rollers operating on the workpiece being fed therebetween. Hitherto solid or thick walled shafts and heavy end bearings have been provided to accommodate such work loading, thereby adding substantial weight and cost to the slitter.

Among the objectives of the present invention are to provide an improved portable slitter which can be readily manually transported to the work site; which has a high strength-to-weight ratio and is light in overall weight; which provides for ready changes in positions of the rolls; which has substantial operational strength and improved work roll registry and alignment under continuous and/or adverse on-site operating conditions; and wherein the work rolls may be selectively of the type for slitting, rib forming, or perforating the workpiece.

In accordance with the invention, the portable slitter comprises a beam-type frame, spaced thin walled and light weight rotary torque tubes mounted in the frame and supporting the slitting, ribbing or perforating rolls and a plurality of pairs of opposed stabilizing support blocks disposed between the shafts and the associated frame beams and providing further strength to the shafts by functioning as intermediate span shaft journal supports carrying the roll work loads imposed on shafts directly into the frame beams. The bearing members are constructed and arranged with respect to the frame such that they can be readily removed and adjusted longitudinally without taking the frame apart.

DESCRIPTION OF THE DRAWINGS

Further objects, features and advantages of the present invention will become apparent from the following detailed description, appended claims and accompanying drawings wherein:

DESCRIPTION OF THE PREFERRED EMBODIMENT

Figure 1:
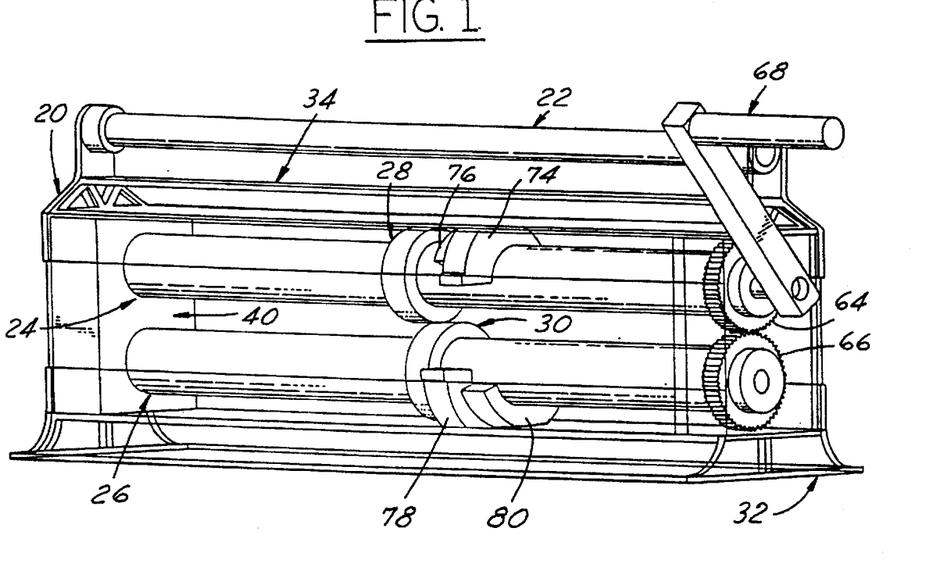
FIG. 1 is a perspective view of one exemplary but preferred embodiment of an improved portable slitter apparatus of the invention, with portions broken away to illustrate detail.
Figure 2:
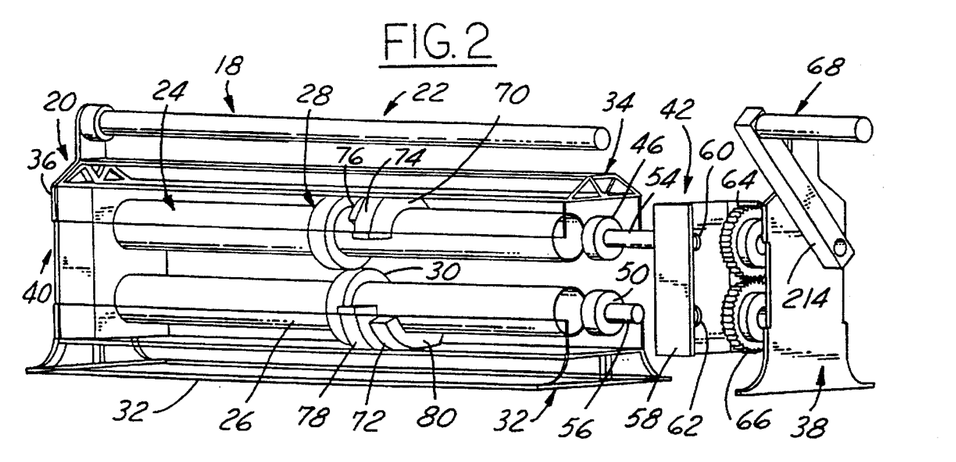
FIG. 2 is a partially exploded perspective view of the embodiment of FIG. 1.
Figure 3:
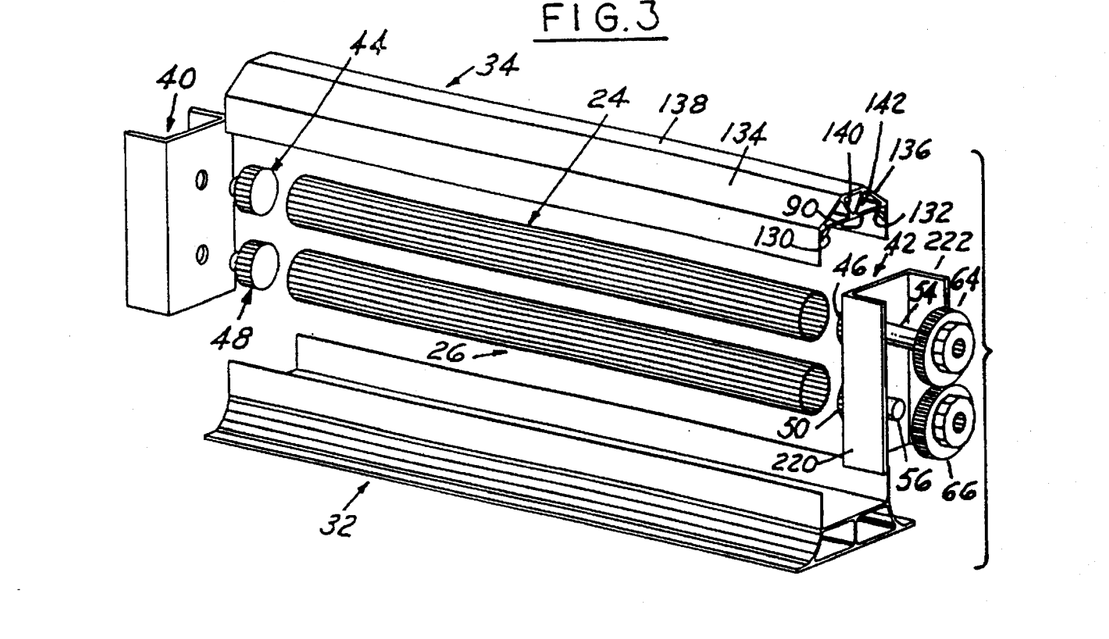
FIG. 3 is a fully exploded perspective view of the slitter of FIG. 1 with some components omitted for clarity.

Referring to FIGS. 1 and 2, the portable slitter 18 embodying the invention generally comprises a frame 20 having a longitudinally extending lifting handle 22 and a pair of longitudinally extending shafts 24 and 26 rotatably mounted in the frame and respectively supporting conventional work rolls 28 and 30 which may be of the type used for slitting as shown, or for rib forming or perforating (not shown). As shown in FIGS. 1, 2 and 3, frame 20 includes an extruded base 32, an extruded top 34 and upright end frame members 36 and 38 with bracket walls 40 and 42 respectively spaced inwardly from the associated frame members 36 and 38 for mounting the roll shafts. Each shaft 24, 26 comprises a hollow thin wall cylindrical tube and includes a pair of end headers 44, 46 and 48, 50 (FIGS. 2 and 3), each of which is cylindrical and extends into the associated end of tubes 24 and 26 respectively. Each header has a flange engaging the engaged ends of the associate tube. Headers 46 and 50 are fixed on drive shafts 54 and 56 respectively which in turn are journalled in openings 60 and 62 the web wall 58 of bracket 42. Shafts 54 and 56 respectively carry gears 64 and 66 which intermesh for counterrotation as driven either by a manually operated crank handle 68 fixed on gear shaft 64 or by a small electric motor (not shown).

Figures 4, 5, 6:
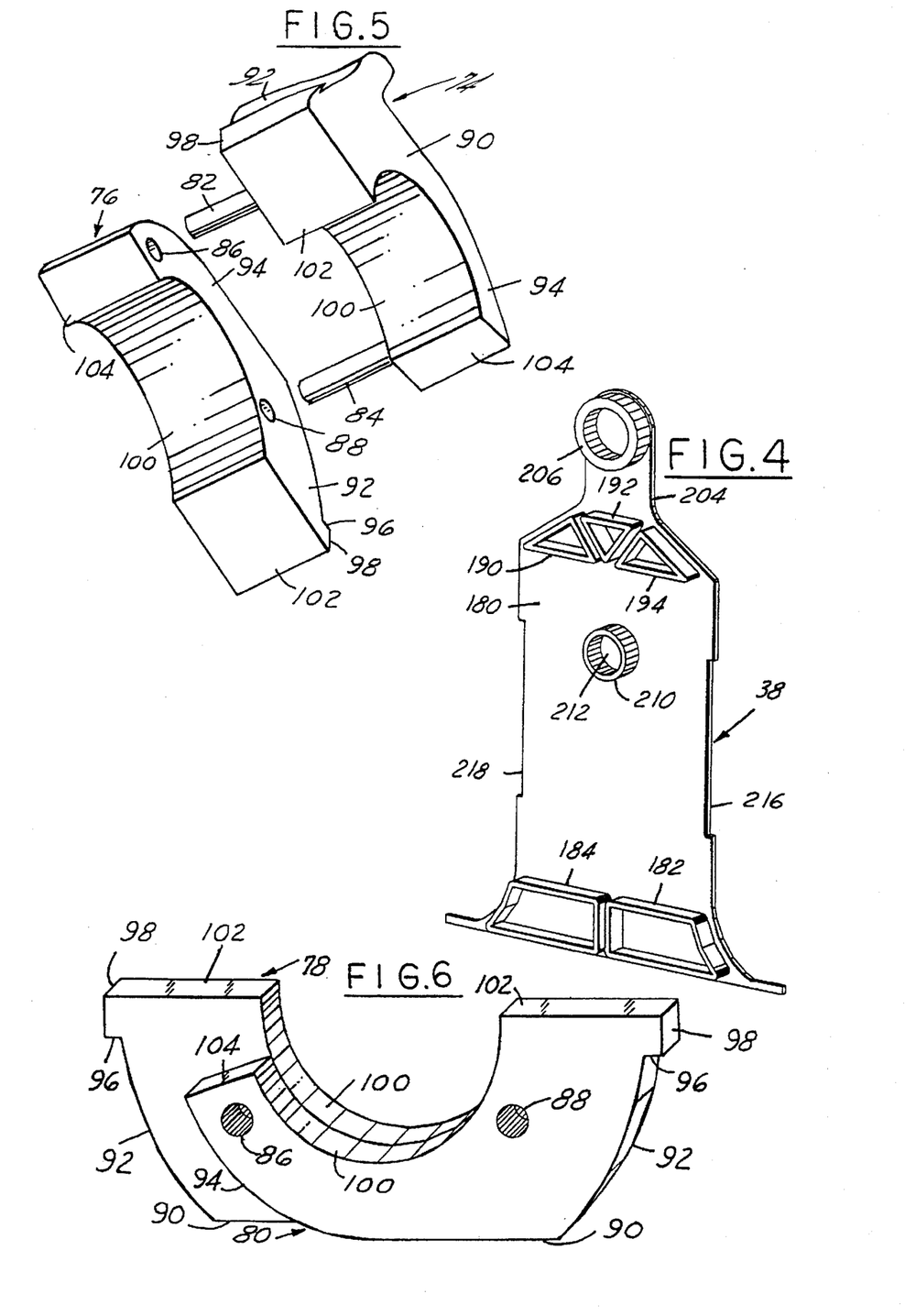
FIG. 4 is a perspective view of the right hand (as viewed in FIGS. 1–3) end plate of the frame of the slitter as viewed from looking at the interior facing surface thereof.
FIG. 5 is an exploded perspective view of one set of upper shaft support blocks as positioned for assembly together for use in support of the upper tool-carrying rotary shaft of the slitter.
FIG. 6 is an exploded perspective view of one set of lower shaft support blocks positioned in operative subassembly relationship.

In accordance with one principal feature of the invention, the portable slitter is also provided with opposed multi-piece upper and lower shaft support blocks 70 and 72 that each include two laterally adjacent and angularly staggered segments 74 and 76 and 78, 80 respectively. Each segment pair is held together by two dowel pins 82 and 84 (FIG. 5) received in axially extending segment holes 86 and 88. Segments 74, 76, 78 and 80 each have a flat bottom surface 90 bounded by a smoothly curved frame engaging convex surfaces 92 and 94. Surface 94 terminates at a shoulder surface 96 of a protruding lug 98 provided at the wider end of each segment. Each segment also has a semi-circular concave smoothly curved bearing surface 100 extending circumferentially through an arc of about 160° at a constant radius of curvature identical to that of the cylindrical peripheral surface of shafts 24 and 26, and terminating at radially extending end faces 102 and 104. The support block segments are thus identical in configuration but are assembled in a mirror-like fashion as shown in FIGS. 5 and 6 with the shoulder surfaces 96 thereof engaging side wall edges on the frame beams.

When it is desired to adjust the position of the bearing support blocks for the associated shafts, the support blocks can be moved longitudinally of frame 20 as desired, and the segment pairs also can be telescopically disengaged from one another to permit individual removal of the block segments from the frame (as described in more detail hereinafter).

More particularly, and in accordance with a further feature of the invention, frame 20 is constructed and arranged such that top 34 and base 32 are relatively rigid extruded beam members with mutually facing channel sections backed up by integrally joined hollow section truss walls, and thereby providing high beam strength resistance to bending moments imposed perpendicularly to the longitudinal axes of base 32 and top 34.

Figure 7:
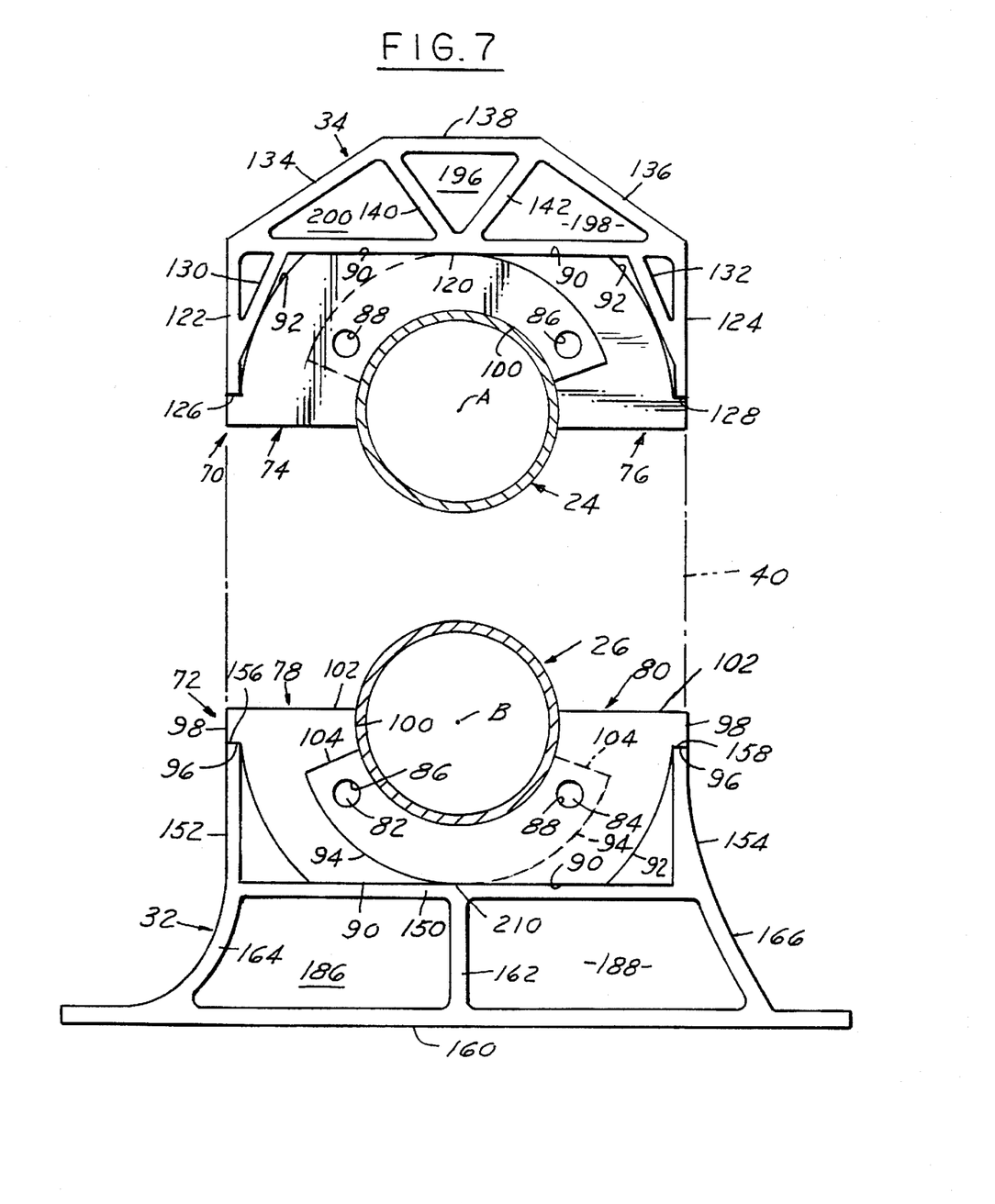
FIG. 7 is a semi-schematic vertical cross sectional view illustrating the operative assembled position of the upper and lower pairs of support block segments between the associated upper shaft and top beam and between the lower shaft and base beam, and providing journal support for the upper and lower tool-carrying shafts at a selected position intermediate the shaft ends and adjacent the rotary work tooling carried on the shafts.

As best seen in FIGS. 3 and 7, frame top 34 as viewed in cross section perpendicular to its longitudinal axis has a center web wall 120 integrally joined at its opposite longitudinal side edges to dependent parallel side walls 122 and 124 extending with their major longitudinal planes perpendicular to the major longitudinal plane of web 120. Lower edges 126 and 128 of walls 122 and 124 are oriented flush with another in a plane extending parallel to and slightly above the rotational axis A of upper shaft 24. Inclined gusset walls 130, 132 integrally interconnect center web 120 with side walls 122 and 124 respectively and brace the corner junction of the side walls with the center web. It will thus be seen that side walls 122 and 124 as integrally joined to web 120 form a C-shaped channel section and cross section for top plate beam 34 highly resistant to bending moments imposed perpendicularly to the longitudinal axis of top 34, as further augmented by gussets 130 and 132.

Even further resistance to such bending moments is provided by a hip-type-roof truss section made up of a pair of mutually inclined roof webs 134 and 136 integrally joined at their outer edges to the junctions of the center web and side walls and interconnected by a roof center web 138. The truss section further includes inclined truss webs 140 and 142 integrally joined at their upper edges to the junction of roof web 138 with its inclined side webs 134 and 136 respectively and converge to an integral common central junction with main web 120. Inasmuch as top 34 is made as a one-piece extrusion, preferably from a light metal alloy such as structural aluminum (or even magnesium), it has a constant cross section throughout its length as shown in FIG. 7, and thus cross sectional configuration has a very high strength-to-weight ratio as well as a very high resistance to bending moments imposed by the operation of work roll tooling on rotary shafts 24 and 26 in operation of the portable slitter.

Likewise, base 32 is formed as a one-piece extruded beam of light metal alloy having a constant cross sectional configuration as shown in FIG. 7. Base 32 has a main center web 150 integrally joined along its opposite longitudinal side edges to upright parallel side walls 152 and 154. The upper longitudinal edges 156 and 158 of walls 152 and 154 also terminate flush with one another in a plane disposed parallel to the rotational axis B of lower shaft 26 and are spaced slightly therebelow. Web 150 and side walls 152, 154 thus form an upwardly opening C-section channel highly resistant to bending moments created by roll tool operation of the slitter. Base 32 is further stiffened as well as stabilized on a suitable support surface for slitter operation by a bottom web 160 spaced below and parallel to main web 150 and extending laterally therebeyond at each side. Bottom web 160 is joined to main web 150 by a center vertical web 162, and by a pair of curved side webs 164 and 166 mutually divergent from web 150 down to their integral curved junctions with bottom web 160. Again, this hollow truss cross sectional configuration of base 32 provides a very high strength-to-weight ratio beam also highly resistant to the work roll load induced bending moments exerted perpendicular to the longitudinal axis of base 32.

In accordance with another feature embodied in the construction of frame 20 of slitter 18 of the invention, as best seen in FIGS. 2 and 4, each of end frame members 36 and 38 comprises a one-piece casting of light metal in the form of a main plate wall 180 having a profile along its side edges generally matching the outer cross sectional contour of base 32 and top 34. The inwardly facing surface of plate 180 has a pair of inwardly protruding base mounting lugs 182 and 184 formed integrally with plate 180 in a casting process. Each lug 182 and 184 is constructed in the form of a thin wall hollow member having a perimeter configuration adapted to slidably receive thereon and snugly fit within base beam openings 186 and 188 respectively defined by base web walls 150 and 160 and truss rib walls 162, 164 and 166 (FIG. 7). It is to be understood that the opposite frame member 36 has like mounting lugs for fitting into the opposite end of the openings 186 and 188 of base beam 32.

Similarly, the interior facing surface of plate 180 adjacent its upper edge has three triangular top mounting lugs 190, 192 and 194 cast integrally therewith and protruding interiorly of the frame, each comprising a thin wall member of triangular cross section. The center triangular lug 192 is contoured on its perimeter to slidably fit snugly within the center opening 196 of top beam 34 (FIG. 7), and the flanking triangular lugs 190 and 194 have a perimeter contour to fit similarly slidably and snugly within the openings 198 and 200 of the roof truss section of top plate 34. Again, end frame plate 36 has corresponding top mounting lugs for fitting into the opposite ends of openings 196, 198 and 200 of top beam 34.

Frame members 36 and 38 thus are easily telescopically assembled to the base 32 and top 34 of frame 20 and provide a very rigid, strong and tension resistant end support structure for these frame beams.

It will also be best seen from FIG. 4 that each of the end frame plates 36 and 38 has an upward extension 204 with an interiorly facing cylindrical boss 206 integrally joined thereto to form a sleeve for receiving the associated cylindrical end of handle 22 telescopically therein. Another integral sleeve 210 is integrally joined to the interior surface of frame plate 180 and encircles an opening 212 therein to provide a journal for drive shaft 54 which in turn protrudes through and exteriorly of frame plate 38 for receiving the inner end of the crank arm 214 of crank handle 68 (FIGS. 1 and 2).

Each of the laterally opposite vertical side edges 216 and 218 of each frame member 36 and 38 respectively receives in flanking relation the side walls 220 and 222 (FIG. 3) of the C-shaped channel bracket 42 in assembly.

Referring again and more particularly to the aforementioned torque-tube/support block feature of the invention, each of the vertically opposed multi-piece upper and lower support blocks 70 and 72 may be installed one segment at a time after the shafts and frame have been assembled, or, if desired, may be installed in subassembled relationship into the associated top 34 and base 32 during initial assembly of slitter 18 when installing the desired work roll tooling 28 and 30 on tubular shafts 24 and 26. This may be done by individually sliding each pinned support block subassembly 70 and 72 endwise into the mutually facing open channels of top 34 and base 32 with the two composite shaft bearing concave surfaces 100 of each of the segments slidably embracing and encompassing approximately 200° of the associated circumferential surface shafts 24 and 26 respectively. Preferably support blocks 70 and 72 are positioned laterally adjacent the associated work roll tooling 28 and 30 to provide close proximity bearing support for the shaft to carry the work loading imposed by the operation of work rolls 28 and 30 and thus eliminate or minimize bending movements and/or thrust loading which such work loading would otherwise impose on the shaft. However, and preferably, support blocks 70 and 72 are designed to fit slidably but snugly in the open channels of top 34 and base 32 so as to be captured therein by such beam engagement as well as by their partially encompassing journal engagement with tubular shafts 24 and 26 respectively, thereby eliminating the need for fasteners. It will be noted that when support block 70 is so secured in operative position solely by such entrapment between the frame top 34 and associated roll shaft 24, the weight of block 70 is carried on upper shaft 24. However, this is a minor loading easily carried by the end frame shaft journal openings. Of course, the reverse is true of the lower support block 72, and its weight as well as that of lower shaft 26 is additive in helping secure by gravity block 72 in nested entrapment in base 32.

It thus will be seen that in assembled relationship of the multi-piece shaft support blocks 70 and 72 the same each provide conjointly, through their two segments as pinned-together in angularly staggered relationship about the periphery of the associated shaft, a rotational journal bearing for the shaft well adapted to transmit work roller thrust loadings. These loads in operation of slitter 18 are primarily directed radially of the rotational axes A or B of the associated shafts 24 and 26 toward the associated top beam 34 and base beam 32. In the case of lower shaft 26, this loading will be directed vertically downwardly onto shaft 26 and thence into block segments 78 and 80 which in turn are supported with against their broad flat surfaces 90 resting on center web 150 of base 32. Similarly the major loading on shaft 24 will be directed vertically upwardly and taken through the upper block segments 74 and 76, and resisted by their flat surfaces support 90 bearing against web 120 of top beam 34.

Additionally, since the conjoint angularly staggered journal surfaces 100 of each segment of a segment pair 74/76 and 78/80 together extend through an arc of approximately 200°, each of the associated shafts 24 and 26 is circumferentially trapped against bodily radial separation from the associated support block. Hence support blocks 70 and 72 are also well adapted to resist side loadings (generally in the direction of work feed through the slitter) imparted by work tool operation, as well as to resist random reverse side loadings, tending to pull shafts 24 and 26 in a horizontal direction (as viewed in FIGS. 7–9). It is also to be understood that the curved surfaces 92 of segments 78–80, in assembly at their junction with beam shoulder surfaces 96 and 126, fit closely against the interior surfaces of the associated side walls 126, 130, 132 and 124 of top 34 and against side walls 152 and 154 of base 32 to provide further support against lateral side thrust loads exerted by the work roll operation on shafts 24 and 26. Segment shoulder surfaces 96 bearing on side wall edges 126, 128, 156 and 158 also help carry vertically directed work loading from the support blocks 72 and 74 into base beam 32 and top beam 34. Due to the segments of each block being pinned together to make a unified support block, shoulder surfaces 96 engaging the side wall edges also help to support both segments of each of the blocks 70 and 72 against bodily rotation for torsional friction forces transmitted from the associated rotary shaft riding on segment journal surfaces 100, and in other direction of shaft rotation.

Figure 8:
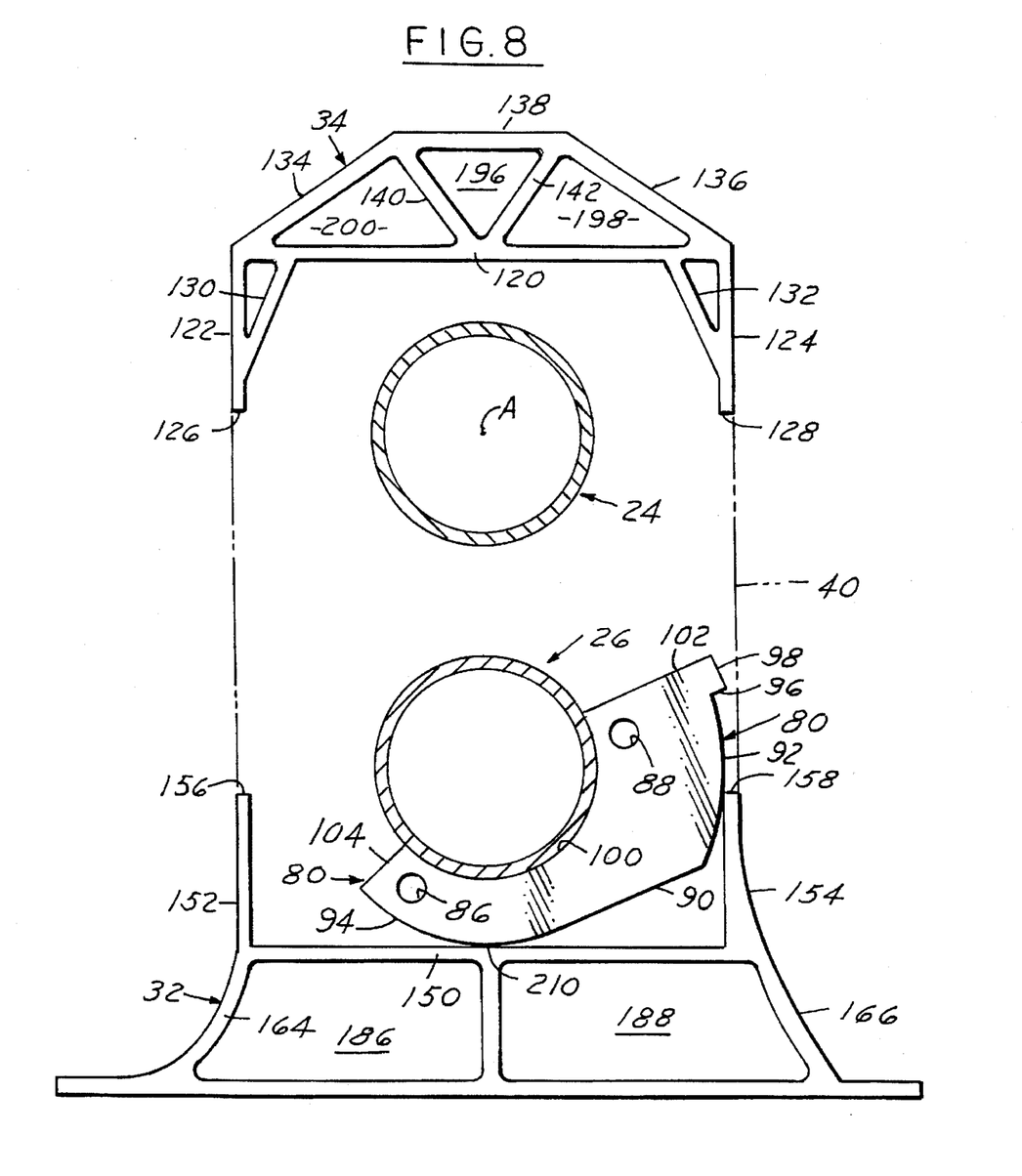
FIG. 8 is a semi-schematic view similar to FIG. 7 illustrating a step in disassembling one of the segments of the lower support block pair.
Figure 9:
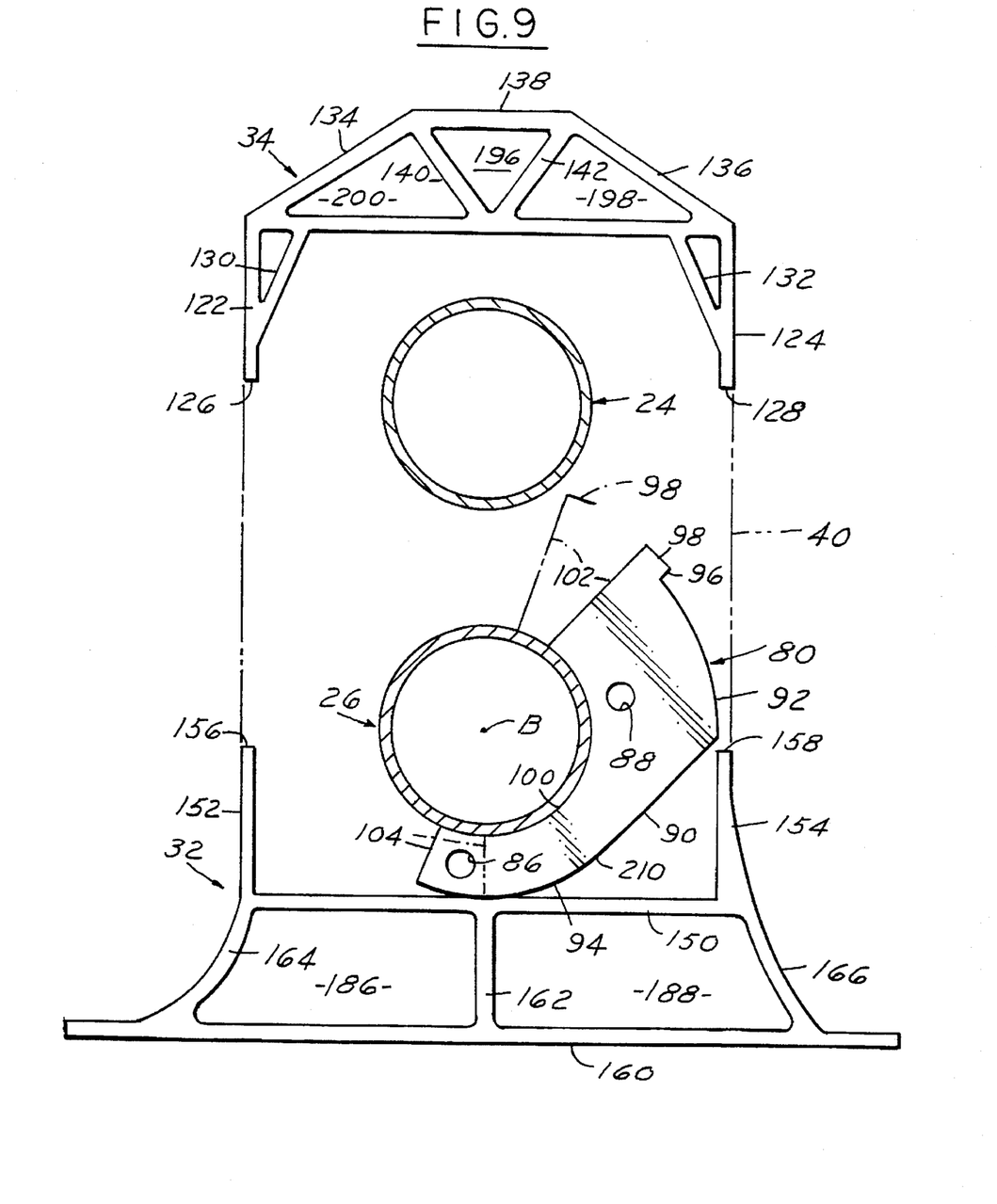
FIG. 9 is a semi-schematic view similar to FIG. 8 illustrating a further bodily rotated positions of the segment being removed from the lower support block pair.

As indicated previously, and in accordance with the further ease-of-adjustment and assembly feature of the invention, each of the multi-piece support blocks 70 and 72 can be assembled and disassembled in-situ piece-by-piece into and from slitter 18 without requiring any disassembly of the other components of the mechanism. Referring to FIGS. 7, 8 and 9 seriatum, this disassembly procedure is illustrated with reference to lower support block 72. First, segment 78 is laterally separated from its companion segment 80 by end-tapping the assembly dowel pins 82 and 84 to remove the same from at least one segment of the segment pair. Each of the segments 78 and 80 of lower block 72 now are free of each other but still nested within the frame beam between the frame and associated shaft. Segment 80 now may be bodily rotated counterclockwise (as viewed in FIG. 7) from its position shown in FIG. 7 through the position shown in FIG. 8 and the position shown in solid FIG. 9 to the removal position shown in phantom in FIG. 9. Such counterclockwise bodily rotation about the axis B of shaft 26 is made possible because the convexly smoothly curved surface 94 is formed on a constant radius of curvature concentric with axis B of shaft 26 extending from its tangential junction at 210 (FIGS. 7, 8 and 9) with flat surface 90 to its termination at end surface 104 of segment 80. Junction 210 in the operative fully assembled position of segment 80 of FIG. 7 is coincident with a line drawn perpendicularly through axis B to the upwardly facing surface of web 150. Hence, once segment 80 has been rotated counterclockwise past the phantom position of FIG. 9 to thereby bring segment end surface 104 coincident with such line drawn from axis B vertically downwardly to the center of web 150, segment 80 is no longer trapped between shaft 26 and web 150 and is free to be bodily withdrawn upwardly and outwardly from slitter 18 via the clearance between base side wall edge 158 and upper segment 76.

It is also to be understood that the curvature of the smoothly curved convex surface 92 of segment 80 is at a constant but larger radius and concentric about axis B of shaft 26 so that the aforementioned counterclockwise rotation of segment 80 from the position of FIG. 7 through the positions of FIGS. 8 and 9 establishes bodily rotational clearance between curved surface 92 and upper edge 158 of side wall 154.

The companion bearing segment 78 likewise can be bodily rotated in the opposite direction, namely clockwise about axis B of shaft 26, until it too is clear of entrapment between shaft 26 and base web 90 so as to then be free for bodily removal from the slitter out through the clearance between edge 156 of side wall 152 and the upper block 70. Assembly of segments 78 and 80 individually into operative position between shaft 26 and base 32 is accomplished by performing the disassembly steps in reverse sequence. A similar disassembly/assembly procedure is performable on upper support block segments 74 and 76 of the associated opposed upper bearing 70.

The multi-piece support blocks 70 and 72 may thus be removed and reinstalled at selected positions longitudinally of the associated shafts 24 and 26, as desired. Worn bearing segments also may be readily replaced in this manner without any disassembly of the remaining components of slitter 18. If desired, two upper support blocks 70 and/or two lower support blocks 72 may be installed in journal support relationship with associated shafts 24 and 26 in flanking relationship with whatever work tooling rolls are selectively provided on the shafts for slitting, forming or perforating the sheet metal workpieces. Blocks 70 and 72 thus can serve as flanking roll guides, as well as flanking load supports, to thereby prevent lateral shifting of the work tooling on the shafts, if desired. If the work load on the particular work tool tend to produce lateral roll movement in only one direction, only one support block 70 or 72 need be provided laterally adjacent the appropriate side of the rotary tool to resist lateral shifting thereof. Although the support blocks are not restrained by fasteners against movement axially along the associated roll-carrying shafts if so used as lateral roll tool guides, then frictional forces seating the block on the frame engaged surfaces will increase with the radially directed main work loading, thereby helping to resist sidewise sliding of the block in direct proportion to side force vector imparted from the curve rolls. Additional support blocks identical to blocks 70 and 72 may also be provided at further locations axially spaced apart along shafts 24 and 26 more remote from the rotary work tooling to further support these shafts against deflection, if needed.

From the foregoing description it will now be understood that the various cooperative features of the invention amply fulfill the aforestated objects and provide many advantages. The overall weight of slitter 18 is substantially reduced to thereby enhance portability due to the provision of counter-rotating thin wall hollow torque tubes 24 and 26, as contrasted with the very heavy solid or thick wall shafts typical of prior art slitters hitherto provided to absorb and resist the shaft bending and spreading loads imparted by the work tooling in operation. Torque tubes 24 and 26 in and of themselves need not resist such bending loads because the same are transmitted into support blocks 70 and 72 and thence into the rigid frame beams 32 and 34. Hence the wall thickness torque tubes 24 and 26 need only be sufficient to accept the torsional loading required to rotate the rotary work tools in operation. The reinforced truss construction of the extruded base 32 and top 34 can resist and react to such loads from the rotary tooling with a minimum deflection so as to transmit such loading into end frames 36 and 38, which in turn are well adapted to take such loading in tension. Base 32 and top 34, being made as hollow extrusions from light metal, have a high strength-to-weight ratio and do not significantly increase the overall weight of the slitter 18. Moreover, they also continue to perform their hitherto sole, normal function of serving as top and bottom structural framework members of the slitter.

Support block segments 74–80 of bearings 70 and 72 can likewise be made of light metal, with their rotary journal surfaces 100 hardened or faced if desired for greater wear resistance. Segments 74–80 can also be modified to carry shaft journal shoes on surface 100, and/or roller bearings provided in this surface for certain applications. Due to the primary work operational loading on the shafts being carried by the support blocks 70 and 72, and also due to light weight of the thin wall tubular shafts 24 and 26, the shaft end support journals in brackets 40 and 42 can be simply journal holes, thereby eliminating the need for additional bearing sleeves or at least the need for more heavy duty and expensive ball or roller bearing assemblies otherwise required to support work thrust loads when the same are entirely carried by the shaft ends.

Because of the easy lateral sliding or remove-and-reinstall adjustment capability of support blocks 70 and 72 longitudinally of shafts 24 and 26, set-up time is reduced. The work loading imposed by the rotary tooling on the shafts 24 and 26 can be taken directly adjacent the tooling, thereby enhancing work tooling operation and accuracy by significantly reducing stress-imposed deflection of the rotary drive shafts carrying the rotary work tooling.

In addition to substantial savings in overall weight, the aforementioned features of the invention significantly contribute to reduced component manufacturing costs and slitter assembly costs, and also provide an improved portable slitter which is accurate and reliable in operation, easily maintained and has a long service life.

It can thus be seen that there has been provided an improved portable slitter which can be readily manually transported to the work site; which has a high strength-to-weight ratio and is light in overall weight; which provides for ready changes in positions of the rolls; which has substantial operational strength and improved work roll registry and alignment under continuous and/or adverse on-site operating conditions; and wherein the work rolls may be selectively of the type for slitting, rib forming, or perforating the workpiece. In one working example of slitter 18 of the invention, the nominal outside diameter of tubular shafts 24 and 26 is two inches, and the wall thickness of the shaft tubing is preferably 0.125 inches.

We claim:

1. A portable opposed rotary work-roll apparatus comprising:

first and second hollow rotary shafts each having a generally cylindrical peripheral surface and a central axis, frame means having end frame means for supporting said shafts adjacent to axially opposite ends of said shafts for rotation about their respective axes oriented generally parallel with one another, and having laterally spaced first and second beam means extending between and interconnecting said end frame means and disposed in positions flanking said shafts, said first and second beam means being disposed respectively laterally outwardly adjacent to said first and second shafts, drive means for imparting counterrotation to said shafts, workpiece rolls mounted in mutually opposed cooperative relation on said shafts for performing a work operation on a sheet material workpiece fed therebetween by applying opposed forces on the workpiece via said rolls, and opposed first and second support block means disposed in mutual shaft-flanking journalled engagement respectively along said first and second shafts axially between said end frame means and respectively nested between said first and second shafts and said first and second beam means.

2. The apparatus set forth in claim 1 including interengaging nesting surface means on said frame beam means and on said support block means for removably supporting said support block means with respect to said frame beam means, and constructed and arranged to permit removal of each said first and second support block means by bodily rotation of said first and second support block means about the axes of said first and second shafts and relative to said first and second frame beam means without disengaging said shafts from said frame means.

3. The apparatus set forth in claim 2 wherein each of said support block means comprises a pair of bearing segments mounted together in side-by-side relationship.

4. The apparatus set forth in claim 3 wherein each pair of said bearing segments are identical and when mounted together provide angularly and laterally staggered shall journal surfaces mutually cooperative for journal encompassing less than the entire cylindrical peripheral surface of the adjacent shaft, said pair of segments being constructed and arranged for bodily rotation in mutually opposite rotary directions about the axis of the adjacent shaft to enable removal thereof from between said beam means and the adjacent shaft.

5. The apparatus set forth in claim 4 wherein said interengaging nesting surface means comprises frame-interengaging mounting surfaces on each of said segments and segment-interengaging mounting surfaces on said beam means.

6. The apparatus set forth in claim 5 wherein each said bearing segment includes a curved surface angularly staggered relative to the frame-interengaging surface of such segment, and constructed and arranged to facilitate removal of said bearing segment by bodily rotation of said segment about the axis of the adjacent one of said shafts.

7. The apparatus set forth in claim 4 wherein each of said bearing segments has a peripheral surface configuration defined by a concave shaft-engaging journal surface portion extending through an arc of less than 180° and defining a radially inner peripheral portion of said peripheral surface, said concave surface having a radius of curvature generally complementary to that of the adjacent one of each shafts, an outer peripheral surface portion spaced radially outwardly of said journal surface, and first and second end surface portions extending radially of said segment between said journal surface portion and said outer peripheral surface portion, said outer peripheral surface portion comprising a generally flat frame-engaging support surface, and first and second convexly curved surfaces flanking said flat support surface and each having a curvature concentric with curvature of said shaft-engaging journal surface portion, said first convexly curved surface portion having a radius of curvature which is less than that of said second convexly curved surface portion, said bearing segments of each pair being mounted side-by-side with journal surface portions of each pair having centers of curvatures that are coincident with one another and with the axis of the adjacent one of said shafts, and also being mounted in reversed relationship with said first outer peripheral convexly curved surface portion of one of said segments closest to said second outer peripheral convexly curved surface portion of the other of said segments such that said concave journal surface portions of both of said segments together extend through an arc of greater than 180° so as to journal encompass the adjacent shaft through an arc greater than 180°.

8. The apparatus set forth in claim 7 wherein said bearing segments of each of said pairs include fastening means removably securing said segments together.

9. The apparatus set forth in claim 8 wherein each said pair of bearing segments includes disengageable fastening means securing said segments together and disengageable therefrom to permit bodily separation of said segments from one another in a direction parallel to the axis of the adjacent one of said shafts.

10. The apparatus set forth in claim 9 wherein each said pair of segments when separated are bodily rotatable in mutually opposite rotary directions about the axis of said adjacent shaft to enable removal of each segment from said beams.

11. The apparatus set forth in claim 1 wherein said first and second frame beam means comprise respectively a top beam and a base beam oriented with their major longitudinal axes disposed generally parallel to one another and spaced laterally apart in exterior adjacent flanking relationship respectively to said first and second shafts, and wherein said end frame means includes first and second end frame support plates disposed at opposite ends of said top and base beams for supporting said top and base beams in said spaced apart relationship and adapted to withstand tension forces exerted on said beams by said support blocks during work operation of said apparatus tending to spread said beams laterally apart.

12. The apparatus set forth in claim 11 wherein each of said beams has an open C-shaped channel section in transverse cross section, each of said C-shaped channel sections opening toward the other of said C-shaped channel sections across said shafts, said first support block being mounted in said channel section of said top beam for journal engagement with said first shaft, said second support block being mounted in said channel section of said base beam for journal engagement with said second shaft.

13. The apparatus set forth in claim 12 wherein said top and base beams each comprise a one-piece extrusion of light metal.

14. The apparatus set forth in claim 12 wherein each said C-shaped channel section includes section wall means forming said interengaging means on said frame means cooperative with interengaging means on said support blocks for removably supporting said support blocks in nested relationship between said channel section wall means.

15. The apparatus set forth in claim 12 wherein each of said top and base beams includes a truss member joined to said channel section and extending longitudinally therealong on a side thereof remote from said first and second shafts.

16. The apparatus set forth in claim 15 wherein said truss members of said top and base beams each define in transverse cross section a hollow closed truss configuration providing a plurality of openings at said opposite ends of each of said beams, and wherein each of said first and second end frame plates includes mounting lug means telescopically engaged with said end openings of said top and base beams.

17. A support block for journalling a rotary work-roll carrying shaft by nesting between the shaft and adjacent support framework comprising a pair of identical bearing segments each having a peripheral surface configuration defined by a concave shaft-engaging journal surface portion extending through an arc of less than 180° and defining a radially inner peripheral portion of said peripheral surface, said concave surface portion having a radius of curvature generally complementary to that of said shaft, an outer peripheral surface portion spaced radially outwardly of said concave surface portion, and first and second end surface portions extending radially of said segment between said concave surface portion and said outer peripheral surface portion, said outer peripheral surface portion comprising a generally flat framework-engaging support surface, and first and second convexly curved surfaces flanking said flat support surface and each having a curvature concentric with curvature of said concave shaft-engaging journal surface portion, said first convexly curved surface portion having a radius of curvature which is less than that of said second convexly curved surface portion, said pair of bearing segments being mountable together side-by-side with concave surface portions of said pair having centers of curvatures coincident with one another and with said shaft, and also being mountable together in reversed relationship with said first outer peripheral convexly curved surface portion of one of said segments closest to said second outer peripheral convexly curved surface portion of the other of said segments such that said concave journal surface portions of both of said segments together extend through an arc of greater than 180° so as to be adapted to journal encompass said shaft through an arc greater than 180°.

18. The support block set forth in claim 17 further including fastening means removably securing said segments together.

19. The support block set forth in claim 18 wherein said fastening means is disengageable from at least one of said segments and is adapted to permit bodily separation of said segments from one another in a direction parallel to said shaft.

20. The support block set forth in claim 19 wherein said pair of segments when separated are adapted to be bodily rotatable in mutually opposite rotary directions about said shaft to enable removal of each segment from the shaft and support framework.

* * * * *